US012618027B2

(12) United States Patent
Röttger

(10) Patent No.: US 12,618,027 B2
(45) Date of Patent: May 5, 2026

(54) DRY WIPE, A BIODEGRADABLE PACKAGING CONTAINING THE DRY WIPE, AN ARRANGEMENT AND A PROCESS FOR PROVIDING A WET WIPE

(71) Applicant: Glatfelter Gernsbach GmbH, Gernsbach (DE)

(72) Inventor: Henning Röttger, Kaltenkirchen (DE)

(73) Assignee: Glatfelter Gernsbach GmbH, Gernsbach (DE)

( * ) Notice: Subject to any disclaimer, the term of this patent is extended or adjusted under 35 U.S.C. 154(b) by 757 days.

(21) Appl. No.: 17/802,279

(22) PCT Filed: Feb. 26, 2021

(86) PCT No.: PCT/EP2021/054787
§ 371 (c)(1),
(2) Date: Aug. 25, 2022

(87) PCT Pub. No.: WO2021/170778
PCT Pub. Date: Sep. 2, 2021

(65) Prior Publication Data

US 2023/0135305 A1 May 4, 2023

(30) Foreign Application Priority Data

Feb. 27, 2020 (EP) .................................... 20159834

(51) Int. Cl.
*C11D 17/04* (2006.01)
*A47K 10/42* (2006.01)
(Continued)

(52) U.S. Cl.
CPC ............ *C11D 17/049* (2013.01); *A47K 10/42* (2013.01); *D04H 1/26* (2013.01); *D04H 1/4258* (2013.01); *D04H 1/587* (2013.01); *D21H 13/08* (2013.01); *D21H 17/28* (2013.01); *D21H 21/36* (2013.01); *D04H 1/492* (2013.01)

(58) Field of Classification Search
None
See application file for complete search history.

(56) References Cited

U.S. PATENT DOCUMENTS 3,905,864 A 9/1975 Curry et al.
6,669,878 B2 12/2003 Yamada et al.
(Continued)

FOREIGN PATENT DOCUMENTS

CA 2002952 A1 * 5/1990 ............. A47L 13/16
CA 2 820 287 A1 6/2012
(Continued)

*Primary Examiner* — Lorna M Douyon
(74) *Attorney, Agent, or Firm* — BURR & FORMAN

(57) ABSTRACT

The present invention relates to a dry wipe, a biodegradable packaging containing the dry wipe, an arrangement comprising the dry wipe and a dispenser container, and a process for providing a wet wipe. The dry wipe comprises a wipe substrate impregnated with at least one additive to be activated by addition of water, wherein the at least one additive is selected from the group consisting of a biocide, a surfactant and a care product, wherein the wipe substrate is configured for allowing a distribution of liquid, even when the dry wipe is stacked in a dispenser container.

19 Claims, 1 Drawing Sheet

(51) Int. Cl.

| | |
|---|---|
| ***C11D 17/06*** | (2006.01) |
| ***D04H 1/26*** | (2012.01) |
| ***D04H 1/4258*** | (2012.01) |
| ***D04H 1/587*** | (2012.01) |
| ***D21H 13/08*** | (2006.01) |
| ***D21H 17/28*** | (2006.01) |
| ***D21H 21/36*** | (2006.01) |
| *D04H 1/492* | (2012.01) |

(56) References Cited

U.S. PATENT DOCUMENTS

| | | | | |
|---|---|---|---|---|
| 7,846,462 | B2 * | 12/2010 | Spadini | A61K 8/46 424/44 |
| 9,661,974 | B2 | 5/2017 | Baker et al. | |
| 2003/0100465 | A1 * | 5/2003 | Kilkenny | C11D 1/835 510/480 |
| 2004/0129632 | A1 | 7/2004 | Le Brech et al. | |
| 2008/0073046 | A1 * | 3/2008 | Dyer | A61K 8/8111 162/112 |
| 2008/0311815 | A1 * | 12/2008 | Gupta | D21H 13/20 162/146 |
| 2010/0212849 | A1 * | 8/2010 | Smith | C11D 3/3749 162/111 |
| 2013/0340541 | A1 | 12/2013 | Qin et al. | |
| 2015/0272836 | A1 | 10/2015 | Bonner et al. | |
| 2017/0233912 | A1 * | 8/2017 | Kellner | D04H 1/4258 15/104.93 |
| 2019/0376011 | A1 * | 12/2019 | Cavadeas | D21H 13/24 |

FOREIGN PATENT DOCUMENTS

| | | | |
|---|---|---|---|
| EP | 0 945 536 | A2 | 9/1999 |
| EP | 2 151 171 | A1 | 2/2010 |
| EP | 2 692 923 | A1 | 2/2014 |
| EP | 2 985 375 | A1 | 2/2016 |
| GB | 1047111 | | 11/1966 |
| GB | 2 439 059 | A | 12/2007 |
| WO | WO 2014/117964 | A1 | 8/2014 |

* cited by examiner

DRY WIPE, A BIODEGRADABLE PACKAGING CONTAINING THE DRY WIPE, AN ARRANGEMENT AND A PROCESS FOR PROVIDING A WET WIPE

CROSS-REFERENCE TO RELATED APPLICATIONS

This application is a U.S. national stage of International Application No. PCT/EP2021/054787, filed Feb. 26, 2021, which claims priority to European Application No. 20159834.9, filed Feb. 27, 2020, the entirety of each of which are incorporated by reference herein.

FIELD OF THE INVENTION

The present invention relates to a dry wipe, a biodegradable packaging containing the dry wipe, an arrangement comprising the dry wipe and a dispenser container, and a process for providing a wet wipe. The dry wipe may in particular made of biodegradable materials.

BACKGROUND

Disposable wipes, such as wet toilet wipes or personal care wipes like baby wipes, facial wipes etc. are very popular for cleaning the skin of human bodies or facilities in the household because of their comfort for consumers and efficacy in cleaning. However, increasing concerns about plastic contamination of the environment create an increasing demand for fully compostable/biodegradable substrates for disposable wipes and similar products. In 2018, about 1.2 million tons of wipes have been used containing a plastic content of about 50%.

Different plastic free substrates for wet wipes are known, but as the wipes are typically shipped in a ready to use wet state, these biodegradable substrates need to be treated with a biocide and packaged in a material providing the required barrier function to avoid evaporation of liquid and additives and to protect the wipes from bacteria, virus and fungi providing a shelf time of up to 3 years. The wet supply/storage format of the wipes is the root cause for the need to use a plastic packaging with advanced barrier function.

Known compostable/biodegradable substrates, such as spunlaced substrates using 100% biodegradable fibers (viscose, tencel, cotton, etc.) or wetlaced substrates using a hydroentangled blend of biodegradable fibers (viscose, tencel, cotton) and pulp, are typically offered as ready to use wet wipes with plastic packaging. Some wipes are offered in a dry format in a plastic container and the lotion in a separate disperser to be added prior to use. This solution does not avoid the use of plastic packaging for the ready to use solution which needs to be protected from bacterial growth like wet wipes. In addition, this solution also does not provide the same user experience like ready to use wet wipe requiring application of liquid for each single use of the wipe.

A method and an apparatus for evaluating the efficacy of a cleaning product is described in US 2013/0340541 A1. US 2015/0272836 A1 discloses wet and dry wipe products comprising a substrate and a stable emulsion, wherein the wipe is sized and configured to enable a user to clean a baby's entire body thereby obviating the need for a bath. EP 2 985 375 A1 discloses a dispersible non-woven fabric comprises natural pulp fibers in an amount of from 70 to 90 wt.-% based on the total weight of the non-woven fabric, wherein at least 20% of the natural pulp fibers have a fiber coarseness of from 1.0 to 2.0 dtex, and cellulosic fibers in an amount of from 10 to 30 wt.-% based on the total weight of the non-woven fabric, wherein at least a part of the pulp fibers and of the cellulosic fibers are entangled with each other. A kit for providing on-demand either a dry wipe, a wet wipe or a warm wet wipe is described in EP 2 151 171 A1. The kit comprises a first container having dry wipes disposed therein, a second container having a heat-generating composition disposed therein and a third container having a cleaning composition disposed therein. EP 2 692 923 A1 discloses a nonwoven fabric material comprising at least one layer of long fibres or of continuous filaments of a biodegradable material and at least one layer of fibers of a water-absorbent material, wherein the biodegradable material comprises polylactic acid in an amount greater than 10% by weight.

OBJECTS OF THE INVENTION

The present invention aims at overcoming the above described problems and drawbacks. Thus, it may be an object of the present invention to supply a wipe in a manner such that the wipe can be stored on shelf dry and activated prior to use in a convenient way by just adding water and placing them in a re-useable dispenser ready for use in a convenient format like a package of traditional wet-wipes. The wipe substrate should provide enough capillary force to actively distribute the water homogenously in the package transferring the dry wipe to a ready to use wet wipe in order to allow the provision of the wipe in a dry format including all additives and biocides required for stabilization of the wipe after adding water.

SUMMARY OF THE INVENTION

The present inventor has made diligent studies and has found that a dry wipe containing all ingredients like biocides or detergents required for the wet-wiping process may be provided in order to avoid the use of packaging material with barrier function only provided by plastic films, but maintain the convenience of a ready to use wet-wipe. Due to the absence of water, such a wipe is resistant to growth of bacteria and fungi and can be supplied wrapped in plastic free biodegradable material like glassine paper. Prior to use, the stack of wipes may be placed in a multiple use dispenser for wet wipes and just water may be added. A wipe substrate with pore structure provides wicking properties homogenously distributing the water in the stack of wipes and dissolving the contained dry active substances, such as biocides and detergents. In particular, the present inventor has found that wipe substrates with a high pulp content may provide suitable wicking properties allowing a homogenous distribution of the water within minutes while wipe substrates, such as conventional spunlaced substrates, have a too open structure may therefore not able to fully distribute the water against gravity.

Accordingly, the present invention relates to a dry wipe comprising a wipe substrate impregnated with at least one additive to be activated by addition of water, wherein the at least one additive is selected from the group consisting of a biocide, a surfactant and a care product, wherein the wipe substrate is configured for allowing a (preferably fast and homogenous) distribution of liquid, even when the dry wipe is stacked in a dispenser container.

In particular, the wipe substrate may be a biodegradable non-woven fabric comprising biodegradable fibers and pulp fibers, wherein at least a part of the biodegradable fibers is entangled with each other (at least partly entrapping pulp fibers), and wherein at least a part of the pulp fibers is covalently bonded (fixed, adhered) to each other (together) by at least one of the group consisting of a biodegradable binder, a biodegradable wet-strength agent and a biodegradable binder fiber (thereby forming a pulp-web-structure integrated into the structure of entangled biodegradable fibers such that a structure is created where the pulp fibers form an integrated structure themselves and/or may not substantially individually move within the entangled fiber structure even after exposure to a liquid, such as water). Such a wipe substrate may be particularly suitable and configured for allowing a distribution of liquid, even when a dry wipe comprising the wipe substrate impregnated with at least one additive selected from the group consisting of a biocide, a surfactant and a care product is stacked in a dispenser container.

The present invention further relates to a biodegradable packaging containing the dry wipe as described herein.

In addition, the present invention relates to an arrangement (or a kit) comprising the dry wipe as described herein, and a (re-usable) dispenser container adapted to accommodate the dry wipe and adapted to allow a (fast) distribution of a liquid, in particular of water, so as to convert (transform) the dry wipe into a wet wipe, wherein the dispenser container has at least one opening adapted to allow addition of the liquid and adapted to allow dispensing of the wet wipe.

Furthermore, the present invention relates to a process for providing a (ready-to-use) wet wipe, the process comprising placing the dry wipe as described herein into a dispenser container, in particular a dispenser container as described herein, and adding a liquid containing water into the dispenser container such that the liquid comes into contact with the dry wipe.

Other objects and many of the attendant advantages of embodiments of the present invention will be readily appreciated and become better understood by reference to the following detailed description of embodiments and the accompanying drawings.

DETAILED DESCRIPTION OF THE INVENTION

Figure 1A:
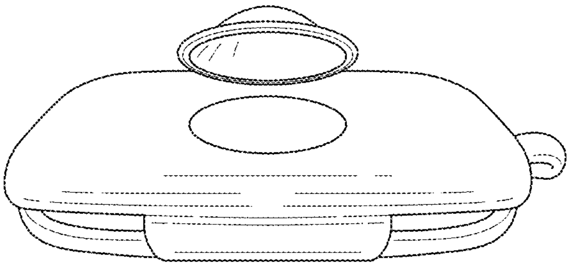
FIG. 1 shows photographs of (A) an exemplary embodiment of a dispenser container and (B) of the dispenser container in an open state, into which exemplary embodiments of a dry wipe have been placed.

Hereinafter, details of the present invention and other features and advantages thereof will be described. However, the present invention is not limited to the following specific descriptions, but they are rather for illustrative purposes only.

It should be noted that features described in connection with one exemplary embodiment or exemplary aspect may be combined with any other exemplary embodiment or exemplary aspect, in particular features described with any exemplary embodiment of a dry wipe may be combined with any other exemplary embodiment of a dry wipe, with any exemplary embodiment of a biodegradable packaging, with any exemplary embodiment of an arrangement and with any exemplary embodiment of a process for providing a wet wipe and vice versa, unless specifically stated otherwise.

Where an indefinite or definite article is used when referring to a singular term, such as "a", "an" or "the", a plural of that term is also included and vice versa, unless specifically stated otherwise, whereas the word "one" or the number "1", as used herein, typically means "just one" or "exactly one".

The expression "comprising", as used herein, includes not only the meaning of "comprising", "including" or "containing", but may also encompass "consisting essentially of" and "consisting of".

Unless specifically stated otherwise, the expression "at least a part of", as used herein, may mean at least 5% thereof, in particular at least 10% thereof, in particular at least 15% thereof, in particular at least 20% thereof, in particular at least 25% thereof, in particular at least 30% thereof, in particular at least 35% thereof, in particular at least 40% thereof, in particular at least 45% thereof, in particular at least 50% thereof, in particular at least 55% thereof, in particular at least 60% thereof, in particular at least 65% thereof, in particular at least 70% thereof, in particular at least 75% thereof, in particular at least 80% thereof, in particular at least 85% thereof, in particular at least 90% thereof, in particular at least 95% thereof, in particular at least 98% thereof, and may also mean 100% thereof.

In a first aspect, the present invention relates to a dry wipe.

The term "wipe", as used herein, may in particular denote a piece of cloth or fabric suitable for wiping over a surface, such as (human) skin or a domestic surface. Examples for a wipe include facial wipes, cosmetic wipes, baby wipes, sanitary wipes, kitchen towel, paper towel, handkerchiefs (facial tissue), cleaning tissue, cleansing tissue, floor mop and hard surface cleaning wipe, which list is however not exhaustive.

The term "dry wipe", as used herein, may in particular mean that the wipe contains substantially no liquid, in particular substantially no water. With regard to embodiments comprising "substantially no liquid" and "substantially no water", respectively, liquid or water, if any, may still be present in relatively minor amounts of up to 10, up to 5, up to 3, up to 2, or up to 1 wt.-% based on the total weight of the wipe. In other words, the solid content of the dry wipes may in particular exceed 90 wt.-%, in particular more than 95 wt. %, such as more than 98 wt.-% or even up to 100 wt.-%.

The dry wipe comprises a wipe substrate.

The term "wipe substrate", which may also be referred to as "non-woven fabric" herein, may in particular denote a web of individual fibers which are at least partially intertwined, but not in a regular manner as in a knitted or woven fabric.

In an embodiment, the wipe substrate is a biodegradable non-woven fabric comprising biodegradable fibers and pulp fibers, wherein at least a part of the biodegradable fibers is entangled with each other, and wherein at least a part of the pulp fibers is covalently bonded to each other by at least one of the group consisting of a biodegradable binder, a biodegradable wet-strength agent and a biodegradable binder fiber.

The term "biodegradable" (which may also be referred to as "compostable"), as used herein, may in particular mean that the material concerned, such as the biodegradable non-woven fabric, the biodegradable fibers, the biodegradable binder fiber, the biodegradable wet-strength agent, the biodegradable binder, the biodegradable material of the biodegradable packaging, and the like, complies at least with the requirements for industrial compostability, for instance in accordance with EN 13432, and preferably also with the requirements for home compostability and is most preferred also marine biodegradable. The term "marine biodegradable", as used herein, may in particular mean that the material biodegrades by more than 90% by weight within 12 month storage in sea water at min. 15° C. and exposure to daylight.

In an embodiment, the biodegradable fibers comprise cellulosic fibers. The term "cellulosic fibers", as used herein, may in particular denote fibers based on cellulose, in particular modified or regenerated cellulose fibers, such as fibers prepared from cellulose, or cellulose derivates, such as ethyl cellulose, cellulose acetate and the like. The term "regenerated cellulose fibers", as used herein, may in particular denote manmade cellulose fibers obtained by a solvent spinning process.

In an embodiment, the regenerated cellulose fibers may be selected from the group consisting of viscose (rayon) or lyocell (tencel).

Viscose is a type of solvent spun fiber produced according to the viscose process typically involving an intermediate dissolution of cellulose as cellulose xanthate and subsequent spinning to fibers.

Lyocell is a type of solvent spun fiber produced according to the aminoxide process typically involving the dissolution of cellulose in N-methylmorpholine N-oxide and subsequent spinning to fibers.

In an embodiment, the biodegradable fibers may have an average fiber length of from 1 mm to 100 mm, for instance an average fiber length of from 3 mm to 80 mm, for instance an average fiber length of from 5 to 70 mm, for instance an average fiber length of from 10 to 65 mm, for instance an average fiber length of from 15 to 60 mm, for instance an average fiber length of from 18 to 50 mm, such as an average fiber length of from 20 to 40 mm. In an embodiment, the biodegradable fibers may have an average fiber length of from 1 mm to 12 mm, in particular of from 3 mm to 10 mm or from 3 mm to 8 mm.

In an embodiment, the biodegradable fibers may have a fiber coarseness of from 0.5 to 10 dtex, in particular from 0.5 to 4.0 dtex or from 1.0 to 10 dtex, such as from 1.0 to 2.5 dtex.

In an embodiment, the biodegradable fibers may be comprised in an amount of from 10 to 80 wt.-%, such as in an amount of from 15 to 70 wt.-%, such as in an amount of from 20 to 60 wt.-%, such as in an amount of from 25 to 50 wt.-%, such as in an amount of from 30 to 40 wt.-%, based on the total weight of the non-woven fabric.

In an embodiment, the pulp fibers may be natural pulp fibers, in particular pulp fibers of natural origin, such as softwood pulp fibers or hardwood pulp fibers.

Pulp may in particular denote a (lignocellulosic) fibrous material prepared by chemically or mechanically separating cellulose fibers from wood or the like, such as by a kraft process (sulfate process).

In an embodiment, the pulp fibers may have an average fiber length of from 1.0 mm to 4.0 mm, for instance from 1.5 mm to 3.5 mm, such as from 2.0 mm to 3.2 mm.

In an embodiment, the pulp fibers may have a fiber coarseness of from 0.3 to 3.5 dtex, such as from 0.6 to 2.5 dtex.

In an embodiment, the pulp fibers may be comprised in an amount of from 20 to 90 wt.-%, such as in an amount of from 30 to 85 wt.-%, such as in an amount of from 40 to 80 wt.-%, such as in an amount of from 50 to 75 wt.-%, such as in an amount of from 60 to 70 wt.-%, based on the total weight of the non-woven fabric.

In an embodiment, the pulp fibers may be comprised in an amount of at least 70 wt.-% (up to 95 wt. % or even up to 100 wt.), in particular in an amount of from 75 to 95 wt.-%, such as in an amount of from 80 to 90 wt.-%, based on the total weight of the non-woven fabric.

In an embodiment of the biodegradable non-woven fabric, at least a part of the biodegradable fibers is entangled with each other. In particular, at least a part of the biodegradable fibers may be entangled with each other such that at least a part of the pulp fibers is entrapped (with)in the entangled biodegradable fibers.

The term "entangled", as used herein, may in particular mean that the biodegradable fibers are at least partly intertwined with each other, thereby imparting strength, such as tear strength or tensile strength, to the non-woven fabric. Entangling of the biodegradable fibers might in particular be achieved by a treatment of a fibrous web with water jets, as will be explained in further detail below, which may also be referred to as "hydroentanglement" or "spunlacing" and the entangled fibers may thus also be referred to as "hydroentangled fibers" or "spunlaced fibers". Alternatively, entangling of the biodegradable fibers might be achieved by needle punching where the biodegradable fibers are mechanically intertwined by means of needles. Alternatively to blending the biodegradable fibers and the pulp forming a layer by means of airlaid or carding or airlay plus airlaid to be fed into the spunlacing unit, the layer of biodegradable fibers may also be formed on top of a layer of tissue using carding or airlay or airlaid technology and then be fed into the spunlacing unit which is disintegrating the tissue forming a web of at least partially entangled biodegradable fibers enclosing at least part of the pulp fibers.

In an embodiment of the biodegradable non-woven fabric, at least a part of the pulp fibers is covalently bonded (fixed, adhered) to each other (thereby forming an integrated pulp layer within the biodegradable spunlaced fiber structure) by at least one of the group consisting of a biodegradable binder, a biodegradable wet-strength agent and a biodegradable binder fiber. As a result of this at least partial covalent bonding of pulp fibers together, a pulp-web-structure may be formed which is integrated into (or embedded in) the structure of entangled biodegradable fibers such that a structure is created where the pulp fibers may not substantially move within the entangled fiber structure even after exposure to a liquid, such as water. Moreover, a clumping of pulp fibers may be substantially avoided. Therefore, the bonding of the pulp fibers is preferably initiated by application of heat after entangling the biodegradable fibers by means of hydroentangling or needle punching.

In an embodiment, in addition to the bonding of the pulp fibers together, at least one of the group consisting of a biodegradable binder, a biodegradable wet-strength agent and a biodegradable binder fiber may optionally, but not necessarily, also bond the biodegradable fibers, in particular the entangled biodegradable fibers, together and may optionally, but not necessarily, also bond pulp fibers to the biodegradable fibers, in particular to the entangled biodegradable fibers. However, without wishing to be bound by any theory, it is believed that the (large) majority of the at least one of the group consisting of a biodegradable binder, a biodegradable wet-strength agent and a biodegradable binder fiber bonds the pulp fibers together (rather than bonding to the biodegradable fibers) thereby forming a pulp-web-structure which may also (but does need to) bond to the structure of entangled biodegradable fibers. In addition, the increase in bulkiness due to the formation of a pulp-web-structure and the resulting integration or embedding thereof within the structure of entangled biodegradable fibers is believed sufficient (even without bonding to the biodegradable fibers) for substantially limiting a free movement of the pulp within the entangled fiber structure even after exposure to a liquid, such as water, and for substantially avoiding extraction and/or clumping. Furthermore, the formation of a layer of inter-bonded pulp fibers within the structure of entangled biodegradable fibers may increase the resiliency of the material.

In an embodiment, at least a part of the pulp fibers is bonded to each other by a biodegradable binder fiber. The term "binder fiber", as used herein, may in particular denote a fiber that is able to bind (e.g. by thermobonding, by forming covalent bonds, by ionic interactions or the like) to each other or to other fibers. Preferably, the biodegradable binder fiber is a biodegradable thermobonding (or thermally activatable) fiber. The biodegradable binder fiber may in particular be a biodegradable thermoplastic fiber. The term "thermoplastic fibers", as used herein, may in particular denote fibers that soften and/or partly melt when exposed to heat and are capable to bind with each other or to other non-thermoplastic fibers, such as cellulose fibers, upon cooling and resolidifying.

In an embodiment, the biodegradable binder fiber comprises a multicomponent fiber, in particular a bicomponent fiber, such as bicomponent fibers of the sheath-core type. Bicomponent fibers are composed of two sorts of polymers having different physical and/or chemical characteristics, in particular different melting characteristics. A bicomponent fiber of the sheath-core type typically has a core of a higher melting point component and a sheath of a lower melting point component.

For example, the biodegradable binder fiber may comprise polylactic acid (PLA), polybutylene succinate (PBS), polybutyratadipate terephthalate (polybutylene adipate terephthalate, PBAT), and other biodegradable thermoplastic polymers. Combinations of two or more thereof may also be applied.

In an embodiment, the biodegradable binder fiber may be comprised in an amount of from 0.1 to 30 wt.-%, such as in an amount of 0.2 to 20 wt.-%, such as in an amount of from 0.2 to 10 wt.-%, such as in an amount of from 0.2 to 7.5 wt.-%, such as in an amount of from 0.35 to 5 wt.-%, such as in an amount of from 0.5 to 4 wt.-%, based on the total weight of the non-woven fabric.

In an embodiment, at least a part of the pulp fibers is bonded to each other by a biodegradable wet-strength agent. The term "wet-strength agent", as used herein, may in particular denote an agent that improves the tensile strength of the non-woven web in the wet state, for instance by forming covalent bonds. In particular, it may be preferred that the wet-strength agent is biodegradable. However, it may also be possible to use a non-biodegradable wet-strength agent (for instance in small amounts not negatively impacting the biodegradability/compostability) which may significantly increase the wet tensile strength of the non-woven fabric.

For example, the biodegradable wet-strength agent may be selected from the group consisting of chitosan, modified starch, cellulose derivatives and others. Combinations of two or more thereof may also be applied. The term "cellulosic derivatives", as used herein, may in particular denote chemically modified (for instance methylated, ethylated, hydroxypropylated, acetylated and/or carboxylated) cellulose compounds, and may in particular include cellulose ethers and cellulose esters, such as methylcellulose, ethylcellulose, hydroxyethyl cellulose, hydroxypropyl cellulose, carboxymethyl cellulose or cellulose acetate.

In an embodiment, the biodegradable wet-strength agent may be comprised in an amount of from 0.1 to 3 wt.-%, such as in an amount of from 0.2 to 2 wt.-%, such as in an amount of from 0.35 to 1.5 wt.-%, such as in an amount of from 0.5 to 1 wt.-%, based on the total weight of the non-woven fabric.

In an embodiment, the biodegradable non-woven fabric may comprise a further wet-strength agent, in particular a non-biodegradable wet-strength agent. An example of the further wet-strength agent may include an epichlorhydrine resin, such as a polyamine-polyamide-epichlorohydrine resin.

In an embodiment, at least a part of the pulp fibers is bonded to each other by a biodegradable binder. The term "binder", as used herein, may in particular denote a chemical compound that is able to bind (e.g. by forming covalent bonds, by ionic interactions or the like) to two or more fibers, thereby interconnecting the fibers, resulting in an increased tensile strength of the web or fabric.

For example, the biodegradable binder may be selected from the group consisting of chitosan, modified starch, cellulose derivatives, in particular blends of carboxymethylcellulose and citric acid, protein based binders, such as casein, and others. Combinations of two or more thereof may also be applied. Further suitable biodegradable binders are disclosed in WO 2014/117964 A1, the disclosure of which is incorporated herein by reference.

In an embodiment, the biodegradable binder may be comprised in an in amount of from 0.05 to 5 wt.-%, such as in an amount of from 0.1 to 4 wt.-%, such as in an amount of from 0.25 to 3 wt.-%, such as in an amount of from 0.5 to 2 wt.-%, based on the total weight of the non-woven fabric.

A wet-strength agent within the meaning of the present application and a binder within the meaning of the present application may in particular be distinguished by the time of its application. A wet-strength agent is typically added to a fiber blend prior to formation of a fibrous web or textile structure. For instance, a wet-strength agent may be applied into or prior to a head box of a paper-making machine. A binder is typically applied after formation of a fibrous web or textile structure, and may even be applied after entanglement of the fibrous web. For instance, a binder may be applied or added to an entangled fibrous web, but preferable prior to drying the entangled web. It is also feasible to apply the binder after drying the hydroentangled web but this would be less efficient due to the necessity of drying the web twice. A binder fiber may be added to the blend of the other fibers prior to formation of a fibrous web or textile structure.

In an embodiment, at least a part of the pulp fibers may be bonded to each other by a biodegradable wet-strength agent and/or by a biodegradable binder, and optionally further by a biodegradable binder fiber. In particular, at least a part of the pulp fibers may be bonded to each other only by a biodegradable wet-strength agent; at least a part of the pulp fibers may be bonded to each other only by a biodegradable binder; at least a part of the pulp fibers may be bonded to each other by a biodegradable wet-strength agent and by a biodegradable binder; at least a part of the pulp fibers may be bonded to each other by a biodegradable wet-strength agent and by a biodegradable binder fiber; at least a part of the pulp fibers may be bonded to each other by a biodegradable binder and by a biodegradable binder fiber; and/or at least a part of the pulp fibers may be bonded to each other by a biodegradable binder, by a biodegradable wet-strength agent and by a biodegradable binder fiber.

In an embodiment, substantially all fibers comprised in the biodegradable non-woven fabric may be biodegradable fibers, in particular substantially all fibers comprised in the biodegradable non-woven fabric may be the biodegradable fibers, the pulp fibers and optionally the biodegradable binder fiber described herein. In other words, it may be possible that the biodegradable non-woven fabric does substantially not comprise any other fibers than biodegradable fibers, in particular no other fibers than the biodegradable fibers, the pulp fibers and optionally the biodegradable binder fiber described herein. With regard to embodiments comprising "substantially no other fibers than biodegradable fibers", other fibers than biodegradable fibers, if any, may still be present in relatively minor amounts of up to 10, up to 5, up to 3, up to 2, or up to 1 wt.-% based on the total weight of the non-woven fabric.

In an embodiment, the biodegradable non-woven fabric may have a grammage or basis weight of from 20 to 150 $g/m^2$, such as from 30 to 125 $g/m^2$, such as from 40 to 100 $g/m^2$, such as from 50 to 80 $g/m^2$.

In an embodiment, the non-woven fabric is non-dispersible in water, rather than dispersible. The term "dispersible" may in particular denote the property of a non-woven fabric to be capable of disintegrating or decomposing in water by applying a relatively low mechanical energy, such as a situation that typically occurs in a toilet upon flushing. In particular, when being flushed, a dispersible non-woven fabric may be no longer intact, for instance a certain amount of individual fibers or of fiber aggregates may be released from the fabric and/or the fabric may break to several pieces. The term "non-dispersible", as used herein, may accordingly denote the property of the non-woven fabric to be capable of resisting to disintegration in water upon applying a relatively low mechanical energy, such as a situation that typically occurs in a toilet upon flushing.

In an embodiment, a biodegradable non-woven fabric as described herein may be produced by a method comprising the steps of:

(a) forming a fibrous web from a fiber blend comprising biodegradable fibers and pulp fibers;
(b) entangling at least a part of the biodegradable fibers with each other by subjecting the fibrous web to a water-jet treatment; and
(c) drying the entangled fibrous web;

wherein the method further comprises at least one (such as one, any two or all three) of the following steps:

(i) applying a biodegradable binder to the entangled fibrous web prior to drying the entangled fibrous web,
(ii) adding a biodegradable wet-strength agent to the fiber blend, and
(iii) blending a biodegradable binder fiber to the fiber blend.

In step (a), the fibrous web may be prepared for instance by a conventional wet-laid process using a wet-laid machine, such as an inclined wire or flat wire machine, or a dry-forming air-laid non-woven manufacturing process. A conventional wet-lay process is described for instance in US 2004/0129632 A1, the disclosure of which is incorporated herein by reference. A suitable dry-forming air-laid non-woven manufacturing process is described for instance in U.S. Pat. No. 3,905,864, the disclosure of which is incorporated herein by reference. Thus, the fibrous web may be formed for instance by a wet-laid process or an air-laid process.

In an embodiment, the fibrous web is formed by a wet-laid process. In another embodiment, the fibrous web is formed by an air-laid process. Also a combination of a carding process or an airlay process combined with an airlaid process is suitable for forming a layer of biodegradable fibers combined with a layer of pulp fibers. Instead of the airlaid process the pulp fibers can also be fed into the process as a tissue/paper layer getting combined with the fiber layer prior to entering the hydroentangling section where the tissue/pulp get disintegrated and blended with the biodegradable fibers.

The fiber blend used for forming the fibrous web comprises biodegradable fibers and pulp fibers and may optionally further comprise a biodegradable binder fiber and/or a biodegradable wet-strength agent.

In step (b), at least a part of the biodegradable fibers are entangled with each other by subjecting the fibrous web to a water-jet treatment. In particular, at least a part of the biodegradable fibers may be entangled with each other such that at least a part of the pulp fibers may be enclosed (with)in the entangled biodegradable fibers (the entangled fibrous web of biodegradable fibers).

The term "water-jet treatment", as used herein, may in particular mean a process of mechanically entangling fibers by giving the fibrous web an impact with jets of water. Water-jet treatment may also be referred to as hydroentanglement or spunlacing. Water-jet treatment typically involves the ejection of fine, high pressure jets of water from a plurality of nozzles on a fibrous web provided on a conveyor belt or forming-wire. The water jets penetrate the web, hit the belt where they may be reflected and pass again the web causing the fibers to entangle. Thus, by subjecting the fibrous web to the water-jet treatment, the fibers are entangled, in particular hydroentangled.

In an embodiment, a biodegradable binder may be applied to the entangled fibrous web. The biodegradable binder may be applied in the form of a solution or dispersion to the entangled fibrous web. For instance, the biodegradable binder may be applied by spraying or other means of liquid application like a size-press, foulard or other. It may be favorable to remove excessive water prior to application of the binder especially in case of spray application by application of vacuum, pressure or other removing excessive water to avoid dilution of the binder.

In step (c), the drying of the entangled fibrous web may preferably be carried out such that the biodegradable binder fiber softens and/or partly melts, in particular is thermally activated, and/or that the biodegradable wet-strength agent and/or the biodegradable binder is cured, in particular undergoes a chemical reaction. In particular, the drying is preferably carried out at a (sufficiently high) temperature to thermally activate the biodegradable binder fiber and/or to cause a chemical reaction of the biodegradable wet-strength agent and/or the biodegradable binder, for instance at a temperature of more than 80° C., such as more than 100° C., such as more than 120° C., such as more than 140° C., such as more than 180° C., depending on the specific biodegradable binder fiber, biodegradable wet-strength agent and/or biodegradable binder used.

The wipe substrate or non-woven fabric is additionally impregnated with at least one additive to be activated by addition of water, wherein the at least one additive is selected from the group consisting of a biocide, a surfactant and a care product. The at least one additive may for instance be applied in the course of producing the wipe substrate or non-woven fabric as described above, for instance prior to the drying step.

In an embodiment, the at least one additive comprises a biocide. The term "biocide", as used herein, which may also be referred to as "biocidal additive", may in particular denote a compound or mixture of compounds having an inhibitory (or antagonistic) effect on the growth of micro-organisms, i.e. compounds that are capable of at least reducing the growth rate (e.g. bacteriostatic agents with respect to controlling the growth of bacteria) and/or compounds that cause toxic effects (e.g. bactericide agents with respect to killing bacteria). The biocidal additive may in particular comprise at least one of a fungicide and/or a bactericide. By taking this measure, the growth and colonization of microorganisms on the wipe, may be prevented, in particular on a wet wipe, which may otherwise be susceptible to microbiological growth.

The biocide is not particularly limited and any biocide customarily used in the field of wipes, may be used. For instance, the biocide may comprise benzoic acid or a salt thereof, such as sodium benzoate.

In an embodiment, the biocide is contained in an amount of from 0.01 to 2 wt.-%, in particular from 0.05 to 1.5 wt.-%, in particular from 0.1 to 1 wt.-%, based on the total weight of the wet wipe.

In an embodiment, the at least one additive comprises a surfactant. The term "surfactant", as used herein, may in particular denote a surface-active agent or detergent, as commonly understood by a person skilled in the art. The surfactant is not particularly limited and any surfactant customarily used in the cosmetic field, may be used, such as an anionic surfactant, a cationic surfactant, a nonionic surfactant and/or an ampholytic surfactants. By taking this measure, the wipe can in particular be provided with cleansing properties.

In an embodiment, the surfactant is contained in an amount of from 0.1 to 10 wt.-%, in particular from 0.2 to 7.5 wt.-%, in particular from 0.5 to 5 wt.-%, based on the total weight of the wet wipe.

In an embodiment, the at least one additive comprises a care product. The term "care product", as used herein, may in particular denote a cosmetic care product or a skin care product, which may have beneficial effects on the user's well-being, but may also include an emollient, a humectant or a perfume.

In an embodiment, the care product is contained in an amount of from 0.1 to 10 wt.-%, in particular from 0.2 to 7.5 wt.-%, in particular from 0.5 to 5 wt.-%, based on the total weight of the wet wipe.

In an embodiment, the at least one additive comprises a biocide and a surfactant. In an embodiment, the at least one additive comprises a biocide and a care product. In an embodiment, the at least one additive comprises a surfactant and a care product. In an embodiment, the at least one additive comprises a biocide, a surfactant and a care product.

The term "to be activated by addition of water", as used herein, may in particular mean that the additive may be rendered active by the addition of water, or more generally in the presence of water. Such activation may for instance include a dissolution of the additive in water.

The wipe substrate or non-woven fabric is configured for allowing a distribution of liquid, even when the dry wipe is stacked in a dispenser container. In particular, the wipe substrate or non-woven fabric may be configured for allowing a fast (for instance within less than 5 minutes, preferably within less than 3 minutes) and/or homogenous distribution of liquid, such as water. This may in particular be achieved by a pore structure of the wipe substrate providing wicking properties homogenously distributing the water in the stack of wipes and dissolving the contained dry active substances, such as biocides and detergents. In particular, wipe substrates with a relatively high pulp content as described in detail above may provide suitable wicking properties allowing a homogenous distribution of the water within few minutes.

In a second aspect, the present invention relates to a biodegradable packaging containing the dry wipe as described herein.

The term "biodegradable packaging", as used herein, may in particular mean that the packaging contains substantially no plastic material, in particular substantially no synthetic plastic material. With regard to embodiments comprising "substantially no (synthetic) plastic material", (synthetic) plastic material, if any, may still be present in relatively minor amounts of up to 10, up to 5, up to 3, up to 2, or up to 1 wt.-% based on the total weight of the packaging.

Since the biodegradable packaging contains the dry wipe as described herein, a barrier function provided by a plastic film as required for conventional packaging of wet wipes, is not required so that biodegradable packaging material may be used. As a result, an environmentally friendly packaging material may be employed without further increasing plastic contamination of the environment.

In an embodiment, the biodegradable packaging is made of a biodegradable material. Glassine paper has proven to be a particularly suitable material for the biodegradable packaging.

In a third aspect, the present invention relates to an arrangement comprising the dry wipe as described herein, and a dispenser container adapted to accommodate the dry wipe and adapted to allow a distribution of a liquid, in particular of water, so as to convert the dry wipe into a wet wipe, wherein the dispenser container has at least one opening adapted to allow addition of the liquid and adapted to allow dispensing of the wet wipe.

The term "dispenser container", as used herein, may in particular denote an openable and closeable body which may accommodate or store a (dry or wet) wipe and may allow dispensing the (wet) wipe, for instance by pulling the wipe by hand. The dispenser container is in particular configured such that a stack of dry wipes as described herein (such as from 10 to 250 wipes, in particular from 50 to 100 wipes) may be placed and accommodated therein. In addition, the dispenser container has at least one opening which may allow addition of liquid, in particular water, and which may allow dispensing of the wet wipe, for instance by pulling the wipe by hand. Moreover, the dispenser container is adapted or configured to allow a distribution of the liquid, in particular of water, so as to convert or transform the dry wipe into a wet wipe. The dispenser container may be re-usable, i.e. it may be used many times or for several stacks of wipes, and may as such also be made of a plastic material without significantly contributing to plastic waste or consumption of resources.

In a fourth aspect, the present invention relates to a process for providing a wet wipe, the process comprising placing the dry wipe as described herein into a dispenser container, preferably a dispenser container as described herein, and adding a liquid containing water into the dispenser container such that the liquid comes into contact with the dry wipe. Since the wipe substrate or non-woven fabric is configured for allowing a (preferably fast, for instance within less than 5 minutes, and/or homogenous) distribution of liquid, even when the dry wipe is stacked in a dispenser container, the dry wipe may be converted or transformed into a wet wipe once it comes into contact with the liquid in the dispenser container. As a result, a ready-to-use wet wipe may be easily and conveniently be provided by the consumer himself.

The present invention is further described by the following drawings, which are solely for the purpose of illustrating specific embodiments, and are not construed as limiting the scope of the invention in any way.

Figure 1B:
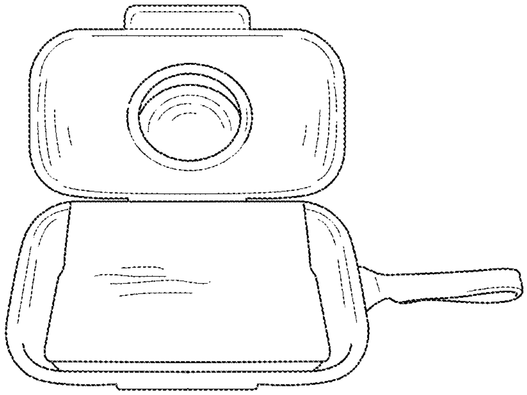

FIG. 1 shows photographs of (A) an exemplary embodiment of a dispenser container and (B) of the dispenser container in an open state, into which exemplary embodiments of a dry wipe have been placed.

FIG. 2 shows photographs of (A) a dispenser container containing wipes according to an embodiment of the invention and (B) a dispenser container containing conventional spunlaced wipes, wherein water containing a fluorescent dye not interacting with the wipes has been added to both dispenser containers.

As previously mentioned, wipe substrates with a high pulp content may provide suitable wicking properties allowing a homogenous distribution of the water within minutes while wipe substrates, such as conventional spunlaced substrates, have a too open structure not able to fully distribute the water against gravity.

This effect can be observed in conventional wet wipes showing an uneven liquid distribution after extended storage time offering a dryer upper region and a high liquid content on the bottom of the wipe stack.

Figure 2A:
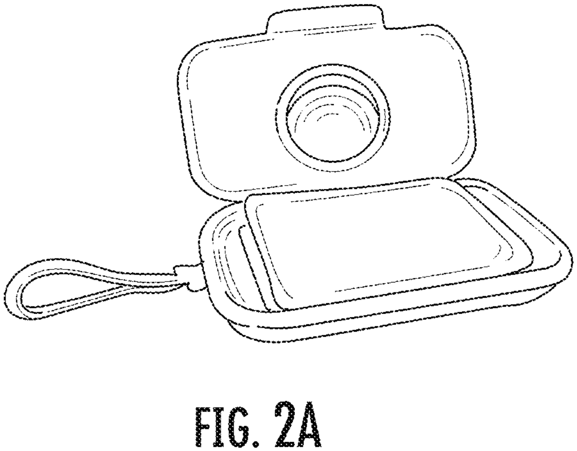
FIG. 2 shows photographs of (A) a dispenser container containing wipes according to an embodiment of the invention and (B) a dispenser container containing conventional spunlaced wipes, wherein water containing a fluorescent dye not interacting with the wipes has been added to both dispenser containers.
Figure 2B:
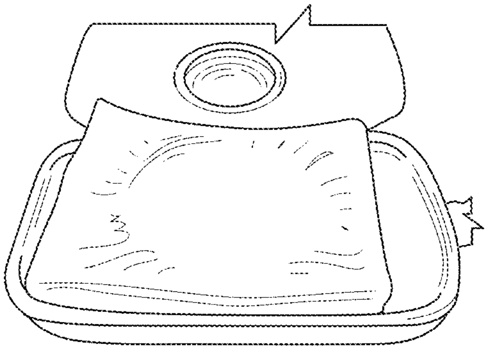

In order to observe the distribution of the liquid poured onto the stack of dry wipes through the top opening of the dispenser (300 weight % of water compared to weight of dry wipes), a fluorescent dye not interacting with the wipe substrate has been added. FIG. 2A shows a homogenous distribution of the liquid after 5 minutes across a stack of 30 folded wipes (this equals 60 layers of substrate). In contrast, FIG. 2B shows a stack of PET (80%)/viscose 20% conventional spunlace wipes and reveals the inhomogeneous distribution of the liquid due to the lack of capillary force keeping larger areas of the wipe dry even after several hours. The effect of uneven distribution of liquid in spunlace wipes (even such made of 100% viscose/tencel) is well known as after a longer period of storage the liquid gathers at the bottom of the stack of wipes while the upper layer has a much lower liquid content or is even dry.

A dry wipe comprising a wipe substrate according to an exemplary embodiment of the invention may provide for sufficient capillary force to secure a homogenous liquid distribution as demonstrated in FIG. 2A and therefore is a suitable biodegradable substrate for wet wipes supplied in a dry format providing the required good wicking properties due to a high pulp content.

In a nutshell, exemplary embodiments of the invention provide a supply format for wet wipes avoiding the need of plastic packaging by supplying the wipe in a dry format but still providing the consumer the full experience of all advantages of using a ready-to-use wet wipe. The step of activating the dry wipe merely requires to place a stack of dry wipes into a multiple use dispenser and to add a certain amount of water. All active ingredients are included in the wipe substrate avoiding the need to add specific solutions with a high concentration of active ingredients requiring additional packaging contributing to plastic waste. Exemplary embodiments of the invention allow to completely avoid the use of plastic for wet wipes by using a biodegradable wipe substrate based on the so-called wetlace-biobond technology developed by the applicant and glassine paper for packaging. In addition to enabling a supply of wet wipe substrates in a biodegradable (dry) packaging, the dry supply format significantly simplifies the production of wet wipes. If the liquid only gets added as water by the consumer prior to use, the handling of wet substrates can be avoided during the manufacturing process of the wipes (packaging, etc.) eliminating a lot of complexity in the supply chain including high hygiene standards during production. The complexity of production of wet wipes can be reduced to the complexity of producing paper handkerchiefs eliminating significant cost.

While the present invention has been described in detail by way of specific embodiments and examples, the invention is not limited thereto and various alterations and modifications are possible, without departing from the scope of the invention.

The invention claimed is:

1. A dry wipe comprising a wipe substrate impregnated with at least one additive to be activated by addition of water, wherein the at least one additive is selected from the group consisting of a biocide, a surfactant and a care product, wherein the wipe substrate is configured for allowing a distribution of liquid, even when the dry wipe is stacked in a dispenser container, wherein the wipe substrate is a biodegradable non-woven fabric comprising biodegradable fibers and pulp fibers, wherein at least a part of the biodegradable fibers is entangled with each other, wherein at least a part of the pulp fibers is covalently bonded to each other by at least one of the group consisting of a biodegradable binder, a biodegradable wet-strength agent and a biodegradable binder fiber, wherein the non-woven fabric is non-dispersible in water.

2. The dry wipe according to claim 1, wherein the biodegradable fibers comprise cellulosic fibers.

3. The dry wipe according to claim 1, wherein the biodegradable fibers comprise regenerated cellulose fibers selected from the group consisting of viscose and lyocell.

4. The dry wipe according to claim 1, wherein the pulp fibers are comprised in an amount of from 20 to 90 wt.-% based on the total weight of the non-woven fabric, and/or wherein the biodegradable fibers are comprised in an amount of from 10 to 80 wt.-% based on the total weight of the non-woven fabric.

5. The dry wipe according to claim 1, wherein at least a part of the pulp fibers is bonded to each other by a biodegradable binder.

6. The dry wipe according to claim 5, wherein the biodegradable binder is selected from the group consisting of chitosan, modified starch, cellulose derivatives, and protein based binders.

7. The dry wipe according to claim 6, wherein the biodegradable binder comprises a blend of carboxymethylcellulose and citric acid.

8. The dry wipe according to claim 1, wherein at least a part of the pulp fibers is bonded to each other by a biodegradable wet-strength agent.

9. The dry wipe according to claim 8, wherein the biodegradable wet-strength agent is selected from the group consisting of chitosan, modified starch and cellulose derivatives.

10. The dry wipe according to claim 1, wherein at least a part of the pulp fibers is bonded to each other by a biodegradable binder fiber.

11. The dry wipe according to claim 10, wherein the biodegradable binder fiber comprises a bicomponent fiber.

12. The dry wipe according to claim 1, wherein the at least one additive comprises a biocide.

13. The dry wipe according to claim 12, wherein the biocide comprises at least one of benzoic acid and a salt thereof.

14. A biodegradable packaging containing the dry wipe according to claim 1.

15. The biodegradable packaging according to claim 14, wherein the biodegradable packaging is made of a biodegradable material.

16. The biodegradable packaging according to claim 15, wherein the biodegradable packaging is made of glassine paper.

17. An arrangement comprising:

the dry wipe according to claim 1, and a dispenser container adapted to accommodate the dry wipe and adapted to allow a distribution of a liquid so as to convert the dry wipe into a wet wipe, wherein the dispenser container has at least one opening adapted to allow addition of the liquid and adapted to allow dispensing of the wet wipe.

18. A process for providing a wet wipe, the process comprising:

placing the dry wipe according to claim 1 into a dispenser container, and adding a liquid containing water into the dispenser container such that the liquid comes into contact with the dry wipe.

19. The process for providing a wet wipe according to claim 18, wherein the dispenser container is adapted to accommodate the dry wipe and adapted to allow a distribution of a liquid so as to convert the dry wipe into a wet wipe, wherein the dispenser container has at least one opening adapted to allow addition of the liquid and adapted to allow dispensing of the wet wipe.

* * * * *